(12) United States Patent
Park

(10) Patent No.: US 10,866,724 B2
(45) Date of Patent: Dec. 15, 2020

(54) INPUT AND OUTPUT METHOD IN TOUCH SCREEN TERMINAL AND APPARATUS THEREFOR

(71) Applicant: Samsung Electronics Co., Ltd., Gyeonggi-do (KR)

(72) Inventor: Chan-Hyoung Park, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/398,418

(22) Filed: Apr. 30, 2019

(65) Prior Publication Data

US 2019/0258376 A1 Aug. 22, 2019

Related U.S. Application Data

(63) Continuation of application No. 13/479,387, filed on May 24, 2012, now Pat. No. 10,282,081.

(30) Foreign Application Priority Data

Aug. 10, 2011 (KR) .................. 10-2011-0079554

(51) Int. Cl.
*G06F 3/0488* (2013.01)
*G06F 3/0481* (2013.01)
*G06F 3/041* (2006.01)

(52) U.S. Cl.
CPC .......... *G06F 3/0488* (2013.01); *G06F 3/0481* (2013.01); *G06F 3/04883* (2013.01);
(Continued)

(58) Field of Classification Search
CPC .. G06F 3/0481; G06F 3/0488; G06F 3/04883; G06F 3/04886
(Continued)

(56) References Cited

U.S. PATENT DOCUMENTS 8,769,431 B1 7/2014 Prasad
8,902,248 B1* 12/2014 Bidarkar .................. G09G 5/02
345/619
(Continued)

FOREIGN PATENT DOCUMENTS

CN 101828162 A 9/2010
CN 101882049 A 11/2010
(Continued)

OTHER PUBLICATIONS

Amy K. Karlson and Benjamin B. Bederson, "ThumbSpace: Generalized One-Handed Input for Touchscreen-Based Mobile Devices", 15 pages.
(Continued)

*Primary Examiner* — Kwin Xie
(74) *Attorney, Agent, or Firm* — Cha & Reiter, LLC.

(57) ABSTRACT

A method and apparatus for further implementing a virtual screen which interworks with a screen of a terminal is provided. The method preferably includes determining a virtual screen which interworks with a screen of the terminal, providing the screen of the terminal and the determined virtual screen together, and displaying an operation according to touch input on the provided virtual screen on the virtual screen and the screen of the terminal, which interworks with the virtual screen. The virtual screen can be overlaid on a software screen and can further visually distinguish the virtual screen from the main screen.

20 Claims, 10 Drawing Sheets

(52) U.S. Cl.
CPC ............... *G06F 3/04886* (2013.01); *G06F 2203/04804* (2013.01); *G06F 2203/04805* (2013.01)

(58) Field of Classification Search
USPC .................................................. 345/173–174
See application file for complete search history.

(56) References Cited

U.S. PATENT DOCUMENTS

| | | | |
|---|---|---|---|
| 2003/0117380 A1 | 6/2003 | Kanzaki | |
| 2003/0210280 A1* | 11/2003 | Baker | G06F 3/0481 715/835 |
| 2005/0099400 A1 | 5/2005 | Lee | |
| 2006/0007178 A1* | 1/2006 | Davis | G06F 3/04886 345/173 |
| 2006/0125799 A1* | 6/2006 | Hillis | G06F 3/011 345/173 |
| 2007/0038955 A1* | 2/2007 | Nguyen | G06F 3/0481 715/804 |
| 2009/0006991 A1* | 1/2009 | Lindberg | G06F 3/04817 715/763 |
| 2009/0013282 A1 | 1/2009 | Mercer | |
| 2009/0027334 A1 | 1/2009 | Foulk et al. | |
| 2009/0178007 A1* | 7/2009 | Matas | G06F 3/04886 715/835 |
| 2010/0062811 A1 | 3/2010 | Park et al. | |
| 2011/0059733 A1* | 3/2011 | Kim | G06F 1/1624 455/418 |
| 2011/0138328 A1 | 6/2011 | Ge | |
| 2011/0169749 A1* | 7/2011 | Ganey | G06F 1/1626 345/173 |
| 2011/0234746 A1* | 9/2011 | Saleh | G06F 3/041 348/14.03 |
| 2011/0304584 A1* | 12/2011 | Hwang | G06F 3/04845 345/174 |

FOREIGN PATENT DOCUMENTS

| | | |
|---|---|---|
| CN | 102117212 A | 7/2011 |
| CN | 102129312 A | 7/2011 |
| DE | 100 16 117 A1 | 3/2000 |
| EP | 1 607 847 A1 | 12/2005 |
| EP | 2 154 602 A1 | 2/2010 |
| JP | 2010-272036 A | 12/2010 |
| KR | 10-2010-0080303 A | 7/2010 |
| KR | 10-2011-0018589 A | 2/2011 |
| WO | 2008/070815 A1 | 6/2008 |

OTHER PUBLICATIONS

Prasad, Roy Varada; "Method for Enabling a One Handed Operation of Large Form Factors Electronic Devices"; Feb. 28, 2013; U.S. Appl. No. 61/771,035 pp. 1-26.
European Search Report dated Jul. 30, 2019.
European Search Report dated Jun. 25, 2020.

* cited by examiner

INPUT AND OUTPUT METHOD IN TOUCH SCREEN TERMINAL AND APPARATUS THEREFOR

CROSS REFERENCE TO RELATED APPLICATION(S)

This application is a Continuation of U.S. patent application Ser. No. 13/479,387 filed on May 24, 2012 which claims the benefit under 35 U.S.C. § 119(a) from a Korean patent application filed in the Korean Intellectual Property Office on Aug. 10, 2011 and assigned Serial No. 10-2011-0079554, the entire disclosure of which is hereby incorporated by reference in its entirety.

BACKGROUND OF THE INVENTION

1. Field of the Invention

The present invention relates to an input and output apparatus of a touch screen terminal including but not limited to a portable terminal. More particularly, the present invention relates to a method and apparatus for implementing ways to interact with a touch screen terminal to make it easier for a user to manipulate a device with a touch screen.

2. Description of the Related Art

Portable terminals such as mobile terminals (cellular phones), electronic schedulers, and personal complex terminals have become necessities of modern society due to research and development of the electronic communication industry. In a short time such portable terminals have developed from mere voice communication devices into important means of information transmission of all types.

Conventionally, a touch screen format has been used in the construction of a portable terminal under a Graphic User Interface (GUI) to increase the convenience for a user who desires to input data, instructions, etc. Moreover, if the user touches text or image information which has previously displayed on the touch screen with his or her finger, the portable terminal ascertains what an item has been selected by the user according to a position of the touched screen and processes a command corresponding to the ascertained information.

Over the last two decades, the Internet has come into wide use for a multitude of applications. The portable terminal has provided various services based on a communication network to complement, and sometimes as part of the Internet. The touch screen provides convenience for using the services. However, the touch screen still provides inconvenience to some users who have difficulty in actually contacting the touch screen so that the portable terminal recognizes the object of the user's touch. For example, when the user holds the portable terminal with his or her one hand and must touch the screen of the touch screen using a thumb of the hand, it is difficult for him or her to touch a distant part on the touch screen.

SUMMARY OF THE INVENTION

An exemplary aspect of the present invention is to solve at least some of the above-mentioned problems and/or disadvantages and to provide at least the advantages described below. Accordingly, an exemplary aspect of the present invention is to provide an input and output method of configuring a virtual screen of a relatively small size, which interworks (i.e. interacts) with a screen of a touch screen terminal, and easily performing touch input and an apparatus therefor.

Another exemplary aspect of the present invention is to provide an input and output method of implementing software buttons mapped with hardware buttons installed out of a screen of the touch screen terminal on a virtual screen and an apparatus therefor.

In accordance with the present invention, an input and output method in a touch screen terminal is provided. The input and output method preferably comprises determining a virtual screen which interworks with a screen of the terminal, providing the screen of the terminal and the determined virtual screen together, and displaying an operation according to touch input on the provided virtual screen on the virtual screen and the screen of the terminal, which interworks with the virtual screen.

In accordance with the present invention, an input and output apparatus in a touch screen terminal is provided. The input and output apparatus preferably comprises an input unit for input, a display unit for output, a storage unit for storing a data, and a controller for controlling an overall operation, wherein the controller determines/configures an arrangement of display of the virtual screen, which interworks with a main screen of the terminal, and outputs the screen of the terminal and the determined virtual screen together on the display unit, and controls the display unit to load an operation according to touch input from the storage unit when the touch input on the virtual screen is output from the input unit and display the loaded operation on the virtual screen and the screen of the terminal, which interworks with the virtual screen. The display of the virtual screen and main screen can be simultaneous, and may be overlapping.

The input and output method may further include determining by a controller a virtual screen which interworks with a main screen of the terminal; providing by the controller an output of the main screen of the terminal and the determined virtual screen together on a same display unit; and displaying an operation according to touch input sensed on the virtual screen, on the virtual screen, wherein a viewable area of the virtual screen and the main screen of the terminal are proportional.

BRIEF DESCRIPTION OF THE DRAWINGS

The above and other exemplary aspects, features and advantages of certain exemplary embodiments of the INPUT AND OUTPUT METHOD IN A TOUCH SCREEN TERMINAL AND APPARATUS THEREFORE according to the present invention will become more apparent to a person or ordinary skill in the art from the following detailed description taken in conjunction with the accompanying drawings, in which.

DETAILED DESCRIPTION

Exemplary embodiments of the present invention will now be described herein below with reference to the accompanying drawings. In the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

The present invention described hereinafter provides an input and output method of a touch screen terminal and an apparatus therefor. More particularly, the prevent invention provides a method and apparatus for further implementing a virtual screen (which in some embodiments constitutes a sub-screen or division of the main or standard screen (see 320 FIG. 3C) and which looks like a screen in its entirety only small than the main screen and the virtual screen interworks with a screen of a terminal. Although a touch range of the virtual screen is narrower than that of the screen of the terminal because the virtual screen is smaller than that of the screen of the terminal, it is easy to perform touch input for generating a corresponding operation of the terminal.

Figure 1:
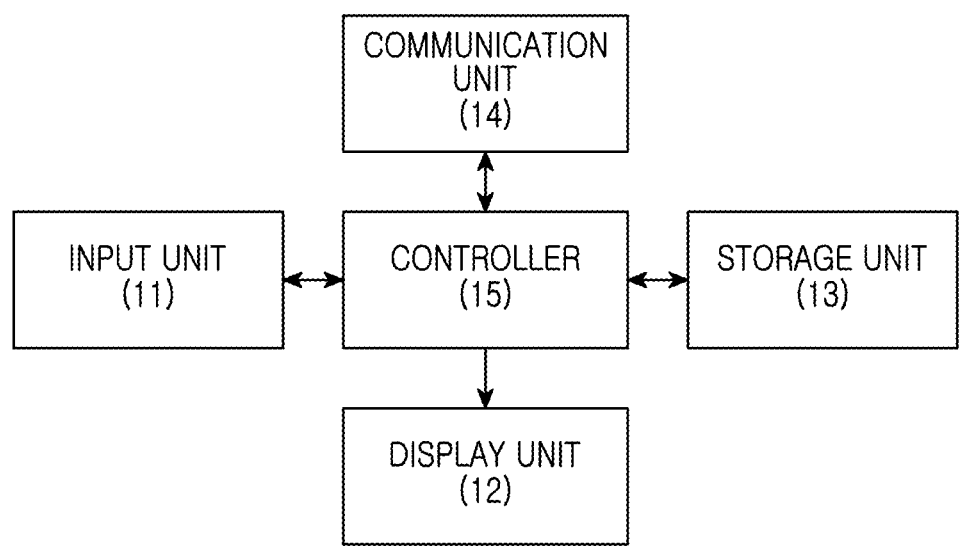
FIG. 1 is a block diagram of a touch screen terminal according to one embodiment of the present invention.

FIG. 1 is a block diagram of a touch screen terminal according to one exemplary embodiment of the present invention.

Referring now to FIG. 1, the touch screen terminal according to an exemplary embodiment of the present invention preferably includes an input unit 11 for input, a display unit 12 for output, a storage unit 13 for storing a data, a communication unit 14 for communication, and a controller 15 for controlling an overall operation.

The input unit 11 outputs an input signal according to a touch of a user and the other input signals to the controller 15. The display unit 12 receives and displays a display data corresponding to the input signal according to control of the controller 15. User touch can be on a keypad, icon, virtual keypad, etc.

The storage unit 13, which comprises a non-transitory machine readable medium, stores a certain program for controlling an overall operation of the touch screen terminal and various data input and output when a control operation of the touch screen terminal is performed.

The communication unit 14 performs wire or wireless communication under control of the controller 15.

The controller 15, which comprises a processor or microprocessor, controls an overall operation of the touch screen terminal.

Hereinafter, an input and output method according to one embodiment of the present invention in the controller 15 will be described in detail with reference to drawings.

Figure 2:
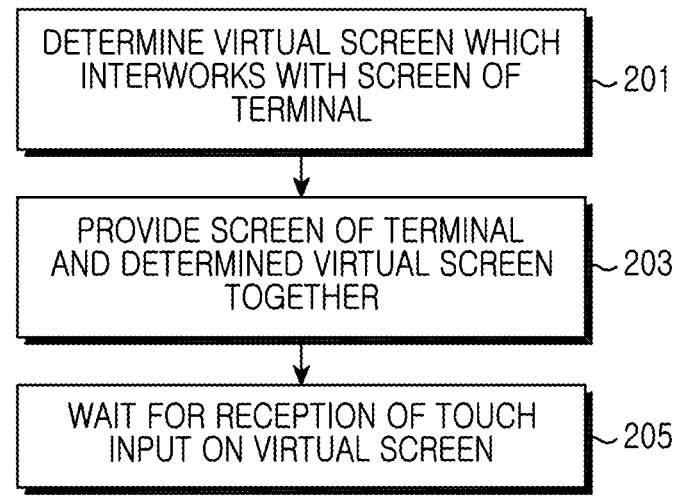
FIG. 2 is a flowchart illustrating a an exemplary process of an input and output method in a portable terminal according to an embodiment of the present invention.

FIG. 2 is a flowchart illustrating an exemplary process of an input and output method in a touch screen terminal according to an exemplary embodiment of the present invention.

Referring now to FIG. 2, the controller 15 of FIG. 1 determines a virtual screen which interworks with a screen of the terminal in step 201. The controller 15 verifies contents displayed on the screen of the terminal and includes the verified contents on a virtual screen to be displayed later. The controller 15 may monitor video output signals in the screen of the terminal and verify the contents by monitoring video output signals. The controller 15 overlays the virtual screen on the screen of the terminal, and displays the verified contents on the virtual screen. The contents includes shortcut such as icons, widgets, etc. In order to perform the process of determining this virtual screen, the controller 15 may have previously performed a process of sensing input for determining the virtual screen. This input may be sensing touch according to a touch of a corresponding icon. The input may be sensing pushing of a corresponding button installed on a screen of the terminal or a touch event may be sensed according to a specific type like a double click.

The controller 15 provides output of the screen of the terminal and the determined virtual screen together for display in step 203. The controller 15 classifies a first layer of the display and a second layer positioned on the first layer of the display. The controller 15 may apply the screen (i.e. main screen) of the terminal to the first layer and may apply the virtual screen to the second layer. In accordance with this configuration, the main screen of the terminal is positioned as a background of the virtual screen.

The controller 15 may semi-transparently process operation of the virtual screen according to corresponding shown on the main screen of the terminal without hiding a display of the may screen of the terminal. In addition, the controller 15 may determine a position and a size of the virtual screen according to corresponding input. A button for generating an operation for adjusting a display type of the virtual screen may be configured on the virtual screen.

It is also within the spirit and scope of the claimed invention that a portion of what was previously being displayed on the main screen may be hidden by the display of the virtual screen, or alternatively, the display of the main screen might shift according to its newly reduced area. The virtual screen is smaller than the screen of the terminal, and typically overlaid on a portion of the screen (i.e. main or regular screen) of the terminal. Accordingly, because the chance of entering an erroneous input is greater with a smaller screen, the controller 15 may enlarge and show a touch point in an enlarged or magnified form to facilitate proper placement of the touch. For example, the controller 15 controls the display unit 12 to enlarge contents displayed on a shape of a predetermined size, which starts the touch point on the virtual screen, and display the enlarged contents on the virtual screen or the screen of the terminal. The shape may be a circle, a quadrangle, etc., and the predetermined size should be visibly larger than the original size to make it easier to touch the correct area. In addition, other types of visual distinguishment (color, flashing, background, font, etc., can be used.

Also, the controller 15 optionally provides software buttons (i.e. virtual buttons) on the virtual screen mapped with at least one or more hardware buttons installed outside of the viewable area of the main screen of the terminal. These hardware buttons may be a volume adjustment button, a home button, etc.

In addition, the controller 15 may provide a button about an operation for hiding or showing the virtual screen again and a button about an operation for ending the virtual screen which can be displayed on the virtual screen.

The controller 15 preferably determines that only a touch input on the virtual screen is valid. Also, the virtual screen provides touch input of all types permitted when only the screen of the terminal is displayed.

In step 205, the controller 15 waits for reception of touch input on the virtual screen. Thereafter, the controller 15 controls the display unit 12 to receive the touch input on the virtual screen and display a corresponding operation according to the reception of the touch input on the virtual screen. The controller 15 controls the display unit 12 to also display the same operation on the screen of the terminal, which interworks with the virtual screen.

Figure 3A:
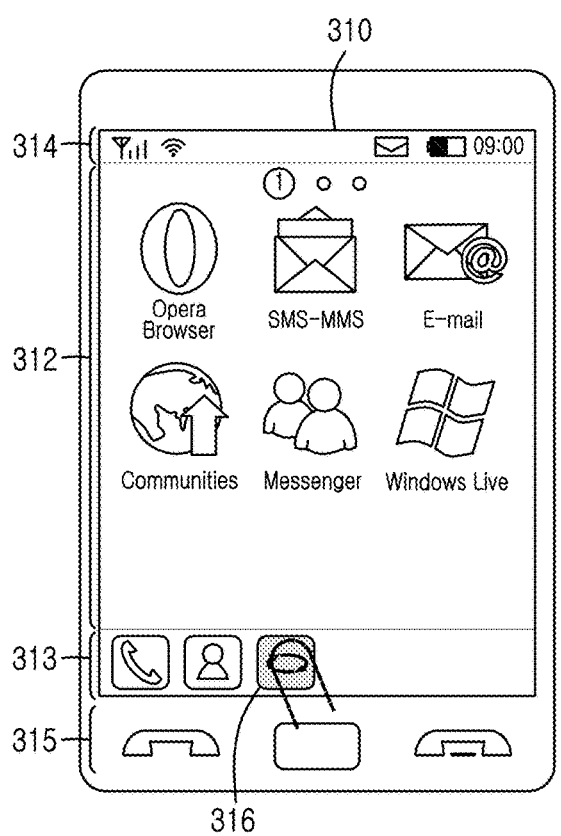
FIGS. 3(*a*) to 3(*c*) are screens illustrating an exemplary process of an input and output method in a touch screen terminal according to an embodiment of the present invention.
Figure 3B:
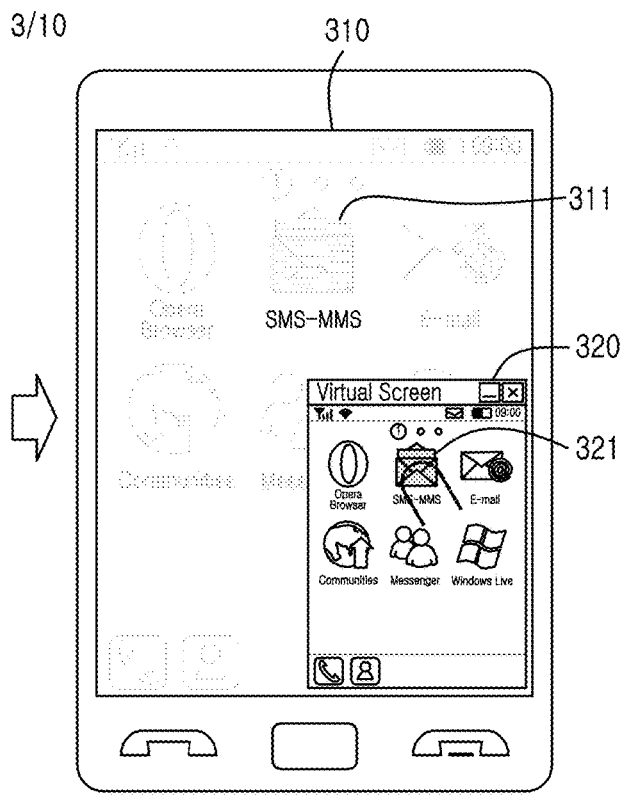
Figure 3C:
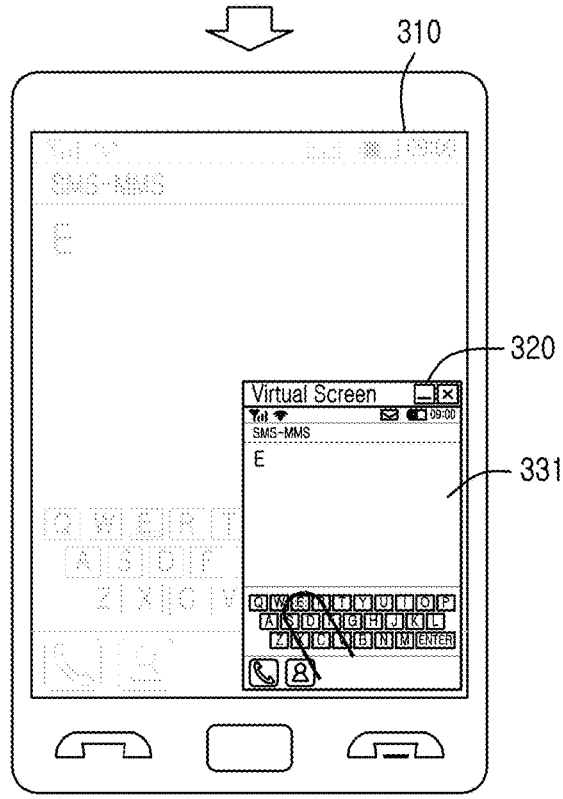

FIGS. 3(a) to 3(c) are screens illustrating an exemplary process of an input and output method in a touch screen terminal according to an exemplary embodiment of the present invention.

Referring now to FIG. 3(a), a screen 310 (for example, a main screen) of the terminal displays contents such as icons 312 corresponding to a plurality of application programs, buttons 313 corresponding to corresponding operations, and various information (e.g., the remaining capacity of a battery, a date, and time, etc.). In addition, the terminal further includes hardware buttons 315 about corresponding operations. If a corresponding button 316 is pushed in FIG. 3(a), then as shown in FIG. 3(b), a virtual screen 320 is determined and provided together with the screen 310 of the terminal.

Referring now to FIG. 3(b), the terminal displays the virtual screen 320 according to the process of FIG. 2. The virtual screen 320 interworks with the screen 310 of the terminal. Contents displayed on the screen 310 of the terminal, shown in FIG. 3(a), are displayed on the virtual screen 320 as shown in FIG. 3(b). If a corresponding icon 321 of the virtual screen 320 is touched, the terminal shows that an icon 311 mapped with the corresponding icon 321 is selected on the screen 310 of the terminal.

Referring now to FIG. 3(c), if the corresponding icon 321 of the virtual screen 320 is touched, an operation of an application program according to the corresponding icon 321 is displayed on the virtual screen 320. In addition, the operation of the application is also displayed on the screen 310 of the terminal.

Figure 4:
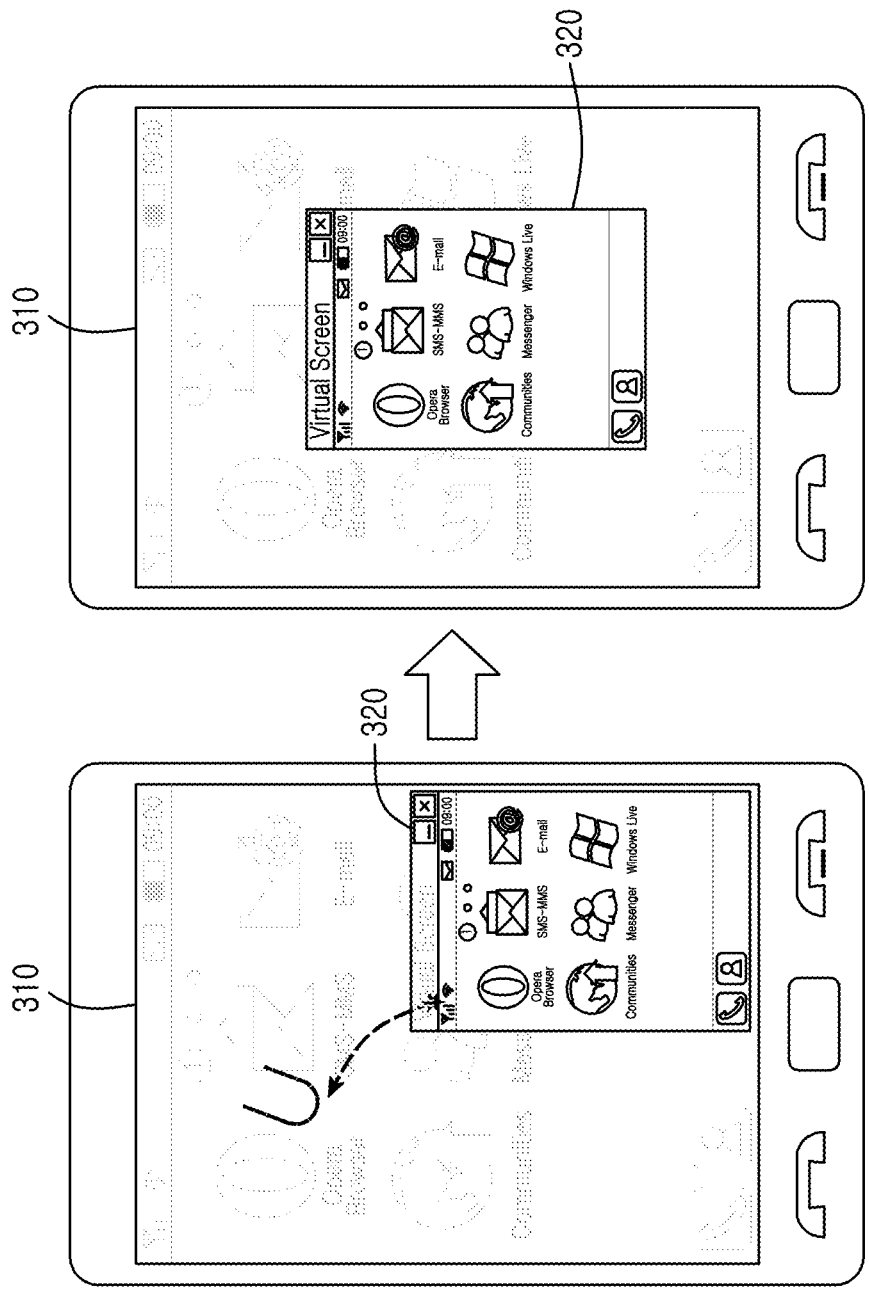
FIG. 4 is a screen illustrating an exemplary process of determining a position of a virtual screen according to an embodiment of the present invention.

FIG. 4 is a screen illustrating a process of determining a position of a virtual screen according to an exemplary embodiment of the present invention.

Referring now to FIG. 4, if input for operating movement of a virtual screen 320 is generated, the virtual screen 320 is in a movable state. A user of a terminal may move and dispose the virtual screen 320.

Figure 5:
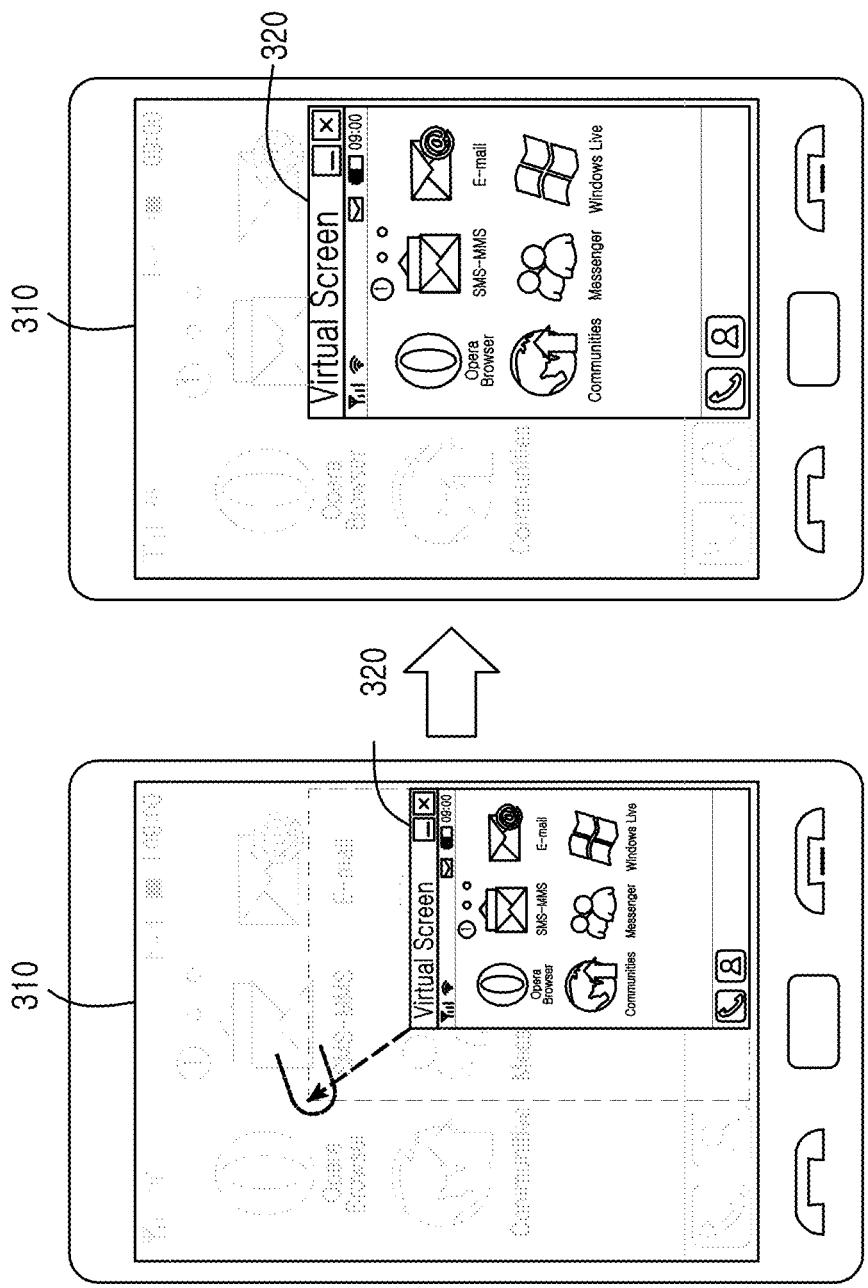
FIG. 5 is a screen illustrating an exemplary process of adjusting a size of a virtual screen according to an embodiment of the present invention.

FIG. 5 is a screen illustrating a process of adjusting a size of a virtual screen according to an exemplary embodiment of the present invention.

Referring now to FIG. 5, if an input for adjusting a size of a virtual screen 320 is generated, the virtual screen 320 is in an adjustable state. A user of a terminal may adjust the size of the virtual screen 320.

Figure 6A:
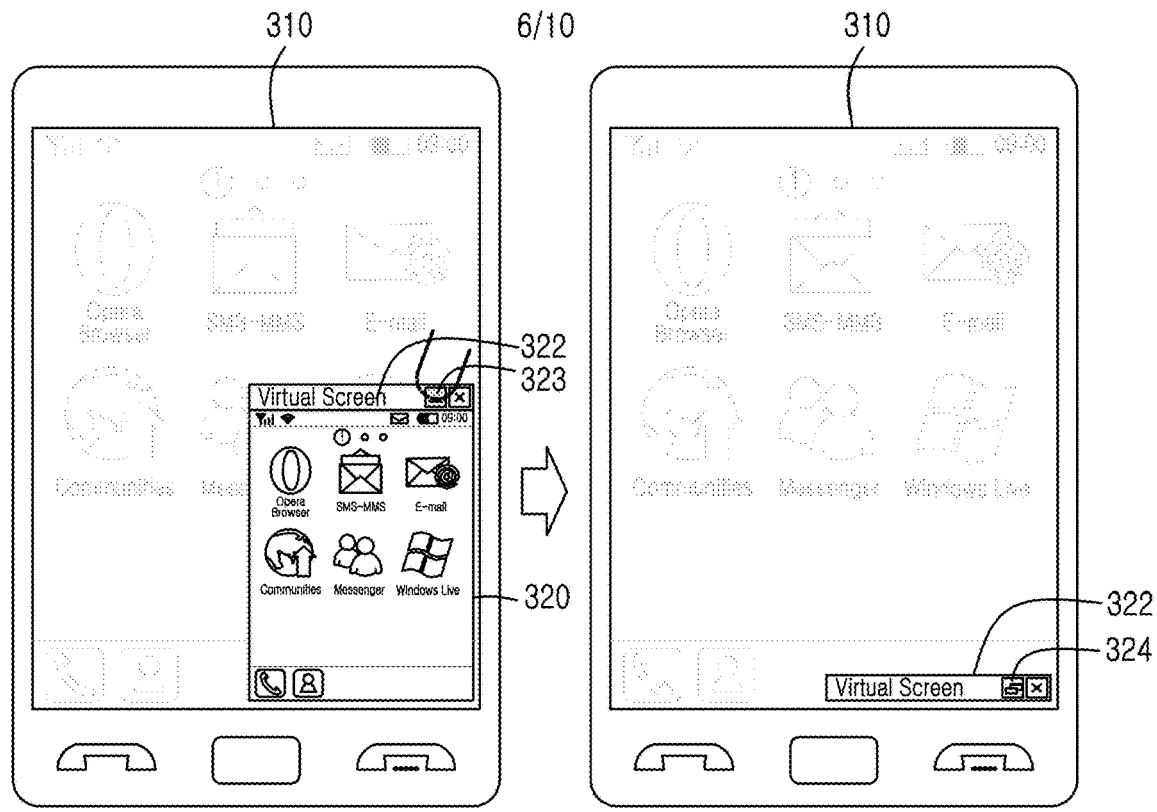
FIGS. 6(*a*) and 6(*b*) are screens illustrating an exemplary process of hiding or showing a virtual screen again according to an embodiment of the present invention.
Figure 6B:
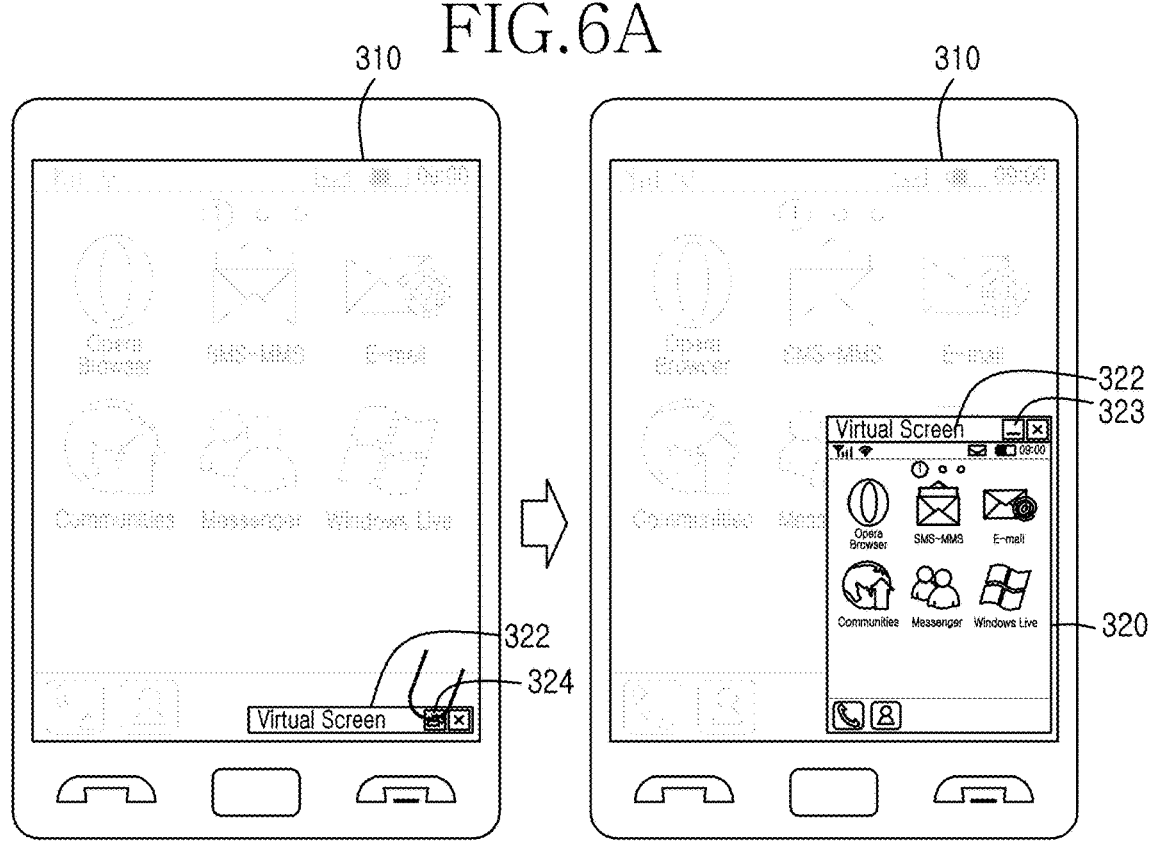

FIGS. 6(a) and 6(b) are screens illustrating a process of hiding or showing a virtual screen again according to an exemplary embodiment of the present invention.

A virtual screen 320 according to one exemplary embodiment of the present invention provides a display line 322. The display line 322 provides a first button 323 corresponding to an operation for hiding the virtual screen 320 and a second button 324 corresponding to an operation for showing the hidden virtual screen again.

Referring now to FIG. 6(a), the virtual screen 320 is shown and the first button 323 is provided on the display line 322. If a user touches the first button 323, only the display line 322 remains and the virtual screen 320 is hidden. When the virtual screen 320 is hidden, the first button 323 is replaced and the second button 324 is provided on the display line 322.

Referring to FIG. 6(b), if the user touches the second button 324 of the display line 322, the hidden virtual screen 320 is shown again. The second button 324 is replaced and the first button 323 is provided on the display line 322.

Figure 7:
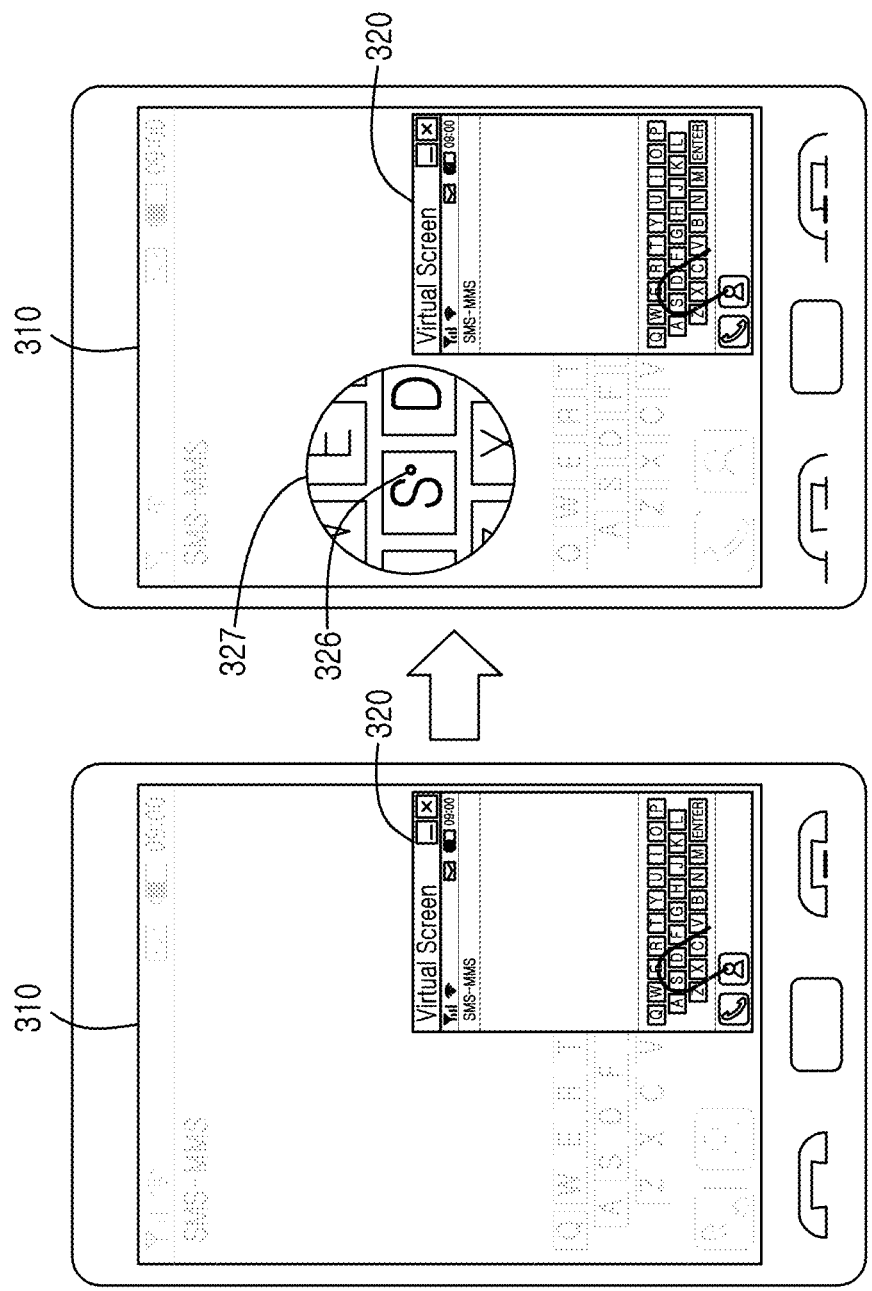
FIG. 7 is a screen illustrating an exemplary process of expanding and showing contents of a virtual screen according to an embodiment of the present invention.

FIG. 7 is a screen illustrating a process of enlarging and showing contents of a virtual screen according to an exemplary embodiment of the present invention.

Referring now to FIG. 7, the controller 15 of FIG. 1 enlarges and displays contents displayed on a shape 327 of a predetermined size, which starts a point 326 touched on a virtual screen 320 according to exemplary embodiment of the present invention, by predetermined magnification and primarily shows the enlarged contents to a user. Accordingly, the user may verify whether or not they are touching the virtual screen 320 correctly. For example, if a touch continues during a threshold time or more, as described above, the controller 15 enlarges and shows a corresponding part which starts a touched point. If a finger of the user is moved in a state where the touch continues, the controller 15 moves and shows a touch point according to the movement of the finger. Finally, if the touch is released, the controller 15 determines touch input corresponding to the released point.

Figure 8:
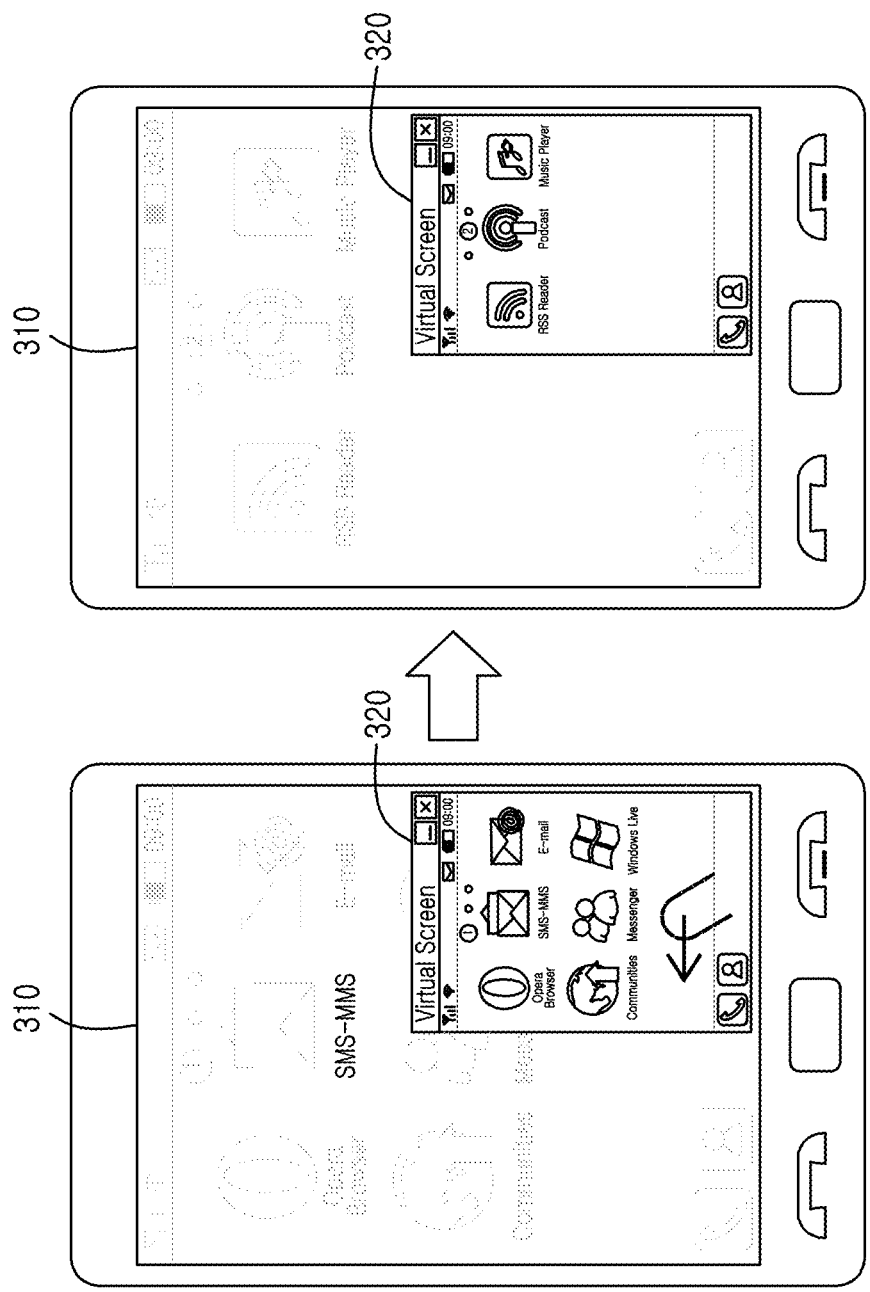
FIG. 8 is a screen illustrating an exemplary process of changing a page on a virtual according to an embodiment of the present invention.

FIG. 8 is a screen illustrating a process of changing a page on a virtual screen according to an exemplary embodiment of the present invention.

Referring now to FIG. 8, if a touch input for changing a page on a virtual screen 320 is generated, the controller 15 of FIG. 1 displays a previous or next page on the virtual screen 320. A screen 310 of the terminal also displays the previous or next page. The touch input for changing the page may be defined as, for example, a flicking touch.

Figure 9:
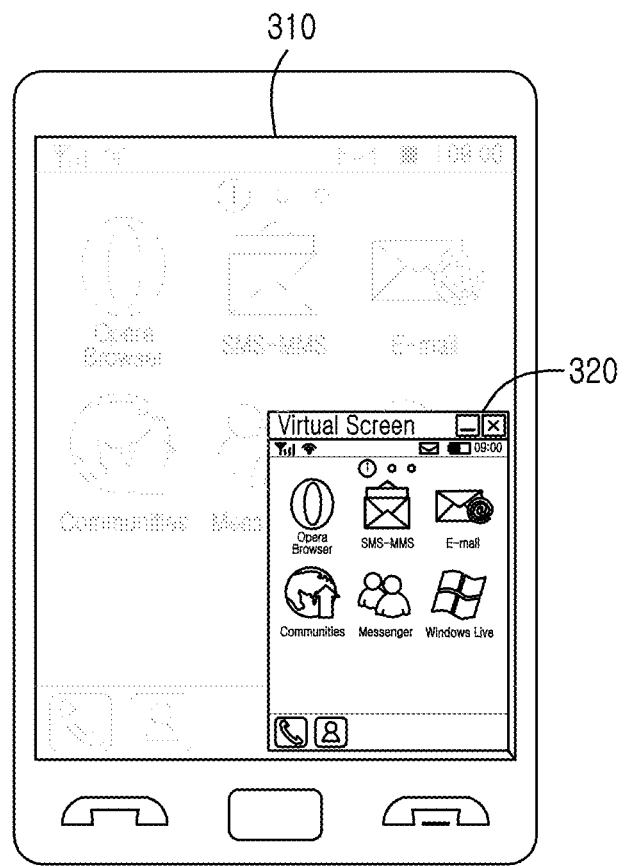
FIG. 9 is a screen illustrating an exemplary process of providing a virtual screen and a screen of a terminal together according to an embodiment of the present invention.

FIG. 9 is a screen illustrating a process of providing a virtual screen and a screen of a terminal together according to exemplary embodiment of the present invention.

Referring now to FIG. 9, a virtual screen 320 is semi-transparently processed and a screen 310 of the terminal is shown without being hidden.

Figure 10:
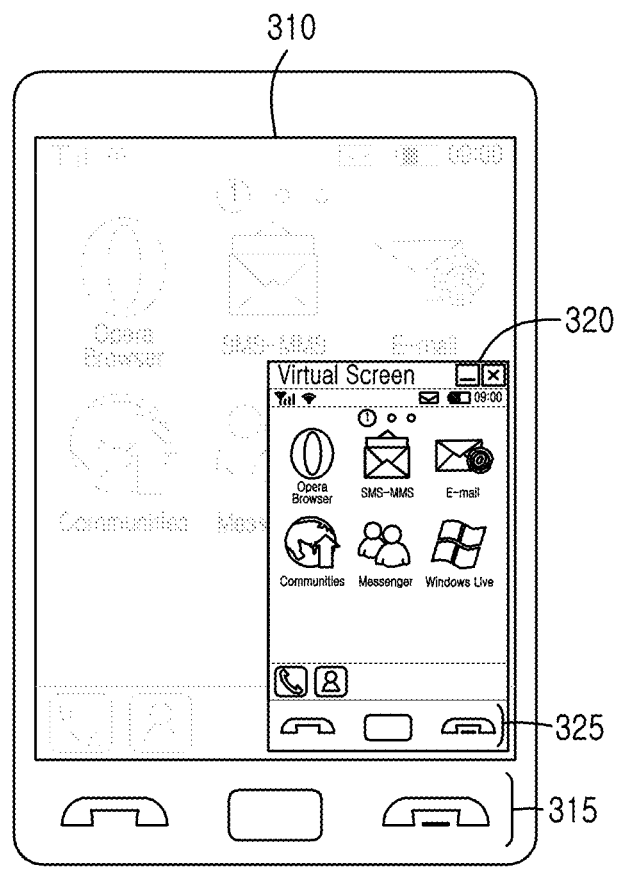
FIG. 10 is a virtual screen according to an exemplary embodiment of the present invention.

FIG. 10 is a virtual screen according to an exemplary embodiment of the present invention.

Referring now to FIG. 10, a virtual screen 320 may further provide software buttons 325 mapped with at least one or more hardware buttons 315 installed out of a screen 310 of a terminal.

In conclusion, an input and output method in a touch screen terminal according to an exemplary embodiment of the present invention implements a virtual screen of a smaller size than an entirety of the display, which interworks with a screen of the terminal, and easily performs touch input in a relatively small touch range.

While the present invention has been particularly shown and described with reference to exemplary embodiments thereof, it will be understood by those skilled in the art that various changes in form and details may be made therein without departing from the spirit and scope of the present invention as defined by the appended claims. When the specification refers to the virtual screen 320 being smaller than the main screen 310, and the drawings show the virtually screen being approximately ⅓rd to ¼ the size of the main screen, the present claims are not limited to this particular reduction, as the virtual screen could be smaller or larger than the remaining visible portion of the main screen of the display.

The above-described methods according to the present invention can be implemented in hardware, firmware or as software or computer code that can be stored in a recording medium such as a CD ROM, an RAM, a floppy disk, a hard disk, thumbnail drive or a magneto-optical disk or computer code downloaded over a network originally stored on a remote recording medium or a non-transitory machine readable medium and to be stored on a local non-transitory recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. An electronic device comprising:
    a touch screen;
    at least one memory configured to store instructions; and
    at least one processor operably coupled with the touch screen,
    wherein the at least one processor, when executing the instructions, is configured to:
    display a first page among a plurality of pages with a plurality of page indicators respectively indicating the plurality of pages, wherein a first page indicator among the plurality of page indicators, that indicates the first page being displayed, is differently presented relative to remaining page indicators among the plurality of page indicators;
    while displaying the first page with the plurality of page indicators, receive a first input with respect to a designated object displayed outside of the first page;
    in response to the reception of the first input, display a reduced first page that is a smaller version of the first page among a plurality of reduced pages that are respectively smaller versions of the plurality of pages with a plurality of reduced page indicators respectively indicating the plurality of reduced pages, and wherein a reduced first page indicator among the plurality of reduced page indicators, that indicates the reduced first page being displayed, is differently presented relative to remaining reduced page indicators;
    while displaying the reduced first page with the plurality of reduced page indicators, receive a second input for switching the reduced first page to a reduced second page among the plurality of reduced pages that is subsequent to the reduced first page; and
    in response to the reception of the second input, display the reduced second page switched from the reduced first page among the plurality of reduced pages with the plurality of reduced page indicators, wherein a reduced second page indicator among the plurality of reduced page indicators, that indicates the reduced second page being displayed, is highlighted relative to remaining reduced page indicators.

2. The electronic device of claim 1, wherein, in response to the reception of the second input, a second page among the plurality of pages that is subsequent to the first page is set as a current page.

3. The electronic device of claim 2, wherein the at least one processor, when executing the instructions, is further configured to:
    while displaying the reduced first page with the plurality of reduced page indicators, receive a drag input from a corner in upper portion of the reduced first page; and
    in response to the reception of the drag input, adjust a size of the reduced first page, based on a length of the drag input.

4. The electronic device of claim 3, wherein the at least one processor, when executing the instructions, is further configured to:
    while displaying the reduced first page with the plurality of reduced page indicators, receive another drag input from another area, that is different from the corner, in the upper portion of the reduced first page; and
    in response to detecting a release of the another drag input, change a display location of the reduced first page, based on a location of the release of the another drag input.

5. The electronic device of claim 4, wherein the reduced first page includes a reduced icon that is a smaller version of an icon included in the first page,
    wherein the at least one processor, when executing the instructions, is further configured to:
    while displaying the reduced first page including the reduced icon with the plurality of reduced page indicators, receive a third input on the reduced icon; and
    in response to the reception of the third input, display a reduced execution screen of an application that is indicated by the reduced icon, and
    wherein the reduced execution screen is switched from the reduced first page and is smaller version of an execution screen of the application.

6. The electronic device of claim 5, wherein the reduced second page is displayed concurrently with a first object for causing the reduced first page to appear or to disappear and a second object for ceasing to display the reduced first page.

7. The electronic device of claim 6, wherein the at least one processor, when executing the instructions, is further configured to:
    while displaying the reduced second page including the first object and the second object, receive a fourth input on the second object; and
    in response to the reception of the fourth input, cease to display the reduced first page and display the second page among the plurality of pages with the plurality of page indicators, wherein a second page indicator among the plurality of page indicators, that indicates the second page being displayed, is highlighted relative to remaining page indicators.

8. The electronic device of claim 7, wherein the at least one processor, when executing the instructions, is further configured to:
   in response to the reception of the first input, display the reduced first page with a reduced status indicator.

9. An electronic device comprising:
   a touch screen;
   at least one memory configured to store instructions; and
   at least one processor operably coupled with the touch screen,
   wherein the at least one processor, when executing the instructions, is configured to:
   display a first page among a plurality of pages with a plurality of page indicators respectively indicating the plurality of pages, wherein a first page indicator among the plurality of page indicators, that indicates the first page being displayed, is differently presented relative to remaining page indicators among the plurality of page indicators;
   while displaying the first page with the plurality of page indicators, receive a first input with respect to a designated object displayed outside of the first page;
   in response to the reception of the first input, display a reduced first page that is a smaller version of the first page among a plurality of reduced pages that are respectively smaller versions of the plurality of pages with a plurality of reduced page indicators respectively indicating the plurality of reduced pages, wherein displaying the reduced first page with the plurality of reduced page indicators comprises displaying a visual effect for at least partially hiding the first page in display area of the touch screen surrounding the reduced first page, and wherein a reduced first page indicator among the plurality of reduced page indicators, that indicates the reduced first page being displayed, is differently presented relative to remaining reduced page indicators;
   while displaying the reduced first page with the plurality of reduced page indicators, receive a second input for switching the reduced first page to a reduced second page among the plurality of reduced pages that is subsequent to the reduced first page; and
   in response to the reception of the second input, display the reduced second page switched from the reduced first page among the plurality of reduced pages with the plurality of reduced page indicators, wherein a reduced second page indicator among the plurality of reduced page indicators, that indicates the reduced second page being displayed, is highlighted relative to remaining reduced page indicators.

10. The electronic device of claim 9, wherein, in response to the reception of the second input, a second page among the plurality of pages that is subsequent to the first page is set as a page to be displayed when ceasing to display the reduced second page with the plurality of reduced page indicators.

11. The electronic device of claim 10, wherein the at least one processor, when executing the instructions, is further configured to:
   while displaying the reduced first page with the plurality of reduced page indicators, receive a drag input from a corner in upper portion of the reduced first page; and
   in response to detecting a release of the drag input, adjust a size of the reduced first page, based on a location of the release of the drag input.

12. The electronic device of claim 11, wherein the at least one processor, when executing the instructions, is further configured to:
   while displaying the reduced first page with the plurality of reduced page indicators, receive another drag input from another area, that is different from the corner, in the upper portion of the reduced first page; and
   in response to detecting a release of the another drag input, change a display location of the reduced first page, based on a location of the release of the another drag input.

13. The electronic device of claim 12, wherein the reduced first page includes a reduced icon that is a smaller version of an icon included in the first page,
   wherein the at least one processor, when executing the instructions, is further configured to:
   while displaying the reduced first page including the reduced icon with the plurality of reduced page indicators, receive a third input on the reduced icon; and
   in response to the reception of the third input, display a reduced execution screen of an application that is indicated by the reduced icon, and
   wherein the reduced execution screen is switched from the reduced first page and is smaller version of an execution screen of the application.

14. The electronic device of claim 13, wherein the reduced second page is displayed concurrently with a first object for causing the reduced first page to appear or to disappear and a second object for ceasing to display the reduced first page.

15. The electronic device of claim 14, wherein the at least one processor, when executing the instructions, is further configured to:
   while displaying the reduced second page including the first icon and a second icon, receive a fourth input on the second object; and
   in response to the reception of the fourth input, cease to display the reduced first page and display the second page among the plurality of pages with the plurality of page indicators, wherein a second page indicator among the plurality of page indicators, that indicates the second page being displayed, is highlighted relative to remaining page indicators.

16. The electronic device of claim 15, wherein the at least one processor, when executing the instructions, is further configured to:
   in response to the reception of the first input, display the reduced first page with a reduced status indicator.

17. A non-transitory computer readable storage medium storing one or more programs, the one or more programs comprising instructions which, when executed by an electronic device with a touch screen, cause the electronic device to:
   display a first page among a plurality of pages with a plurality of page indicators respectively indicating the plurality of pages, wherein a first page indicator among the plurality of page indicators, that indicates the first page being displayed, is differently presented relative to remaining page indicators among the plurality of page indicators;
   while displaying the first page with the plurality of page indicators, receive a first input with respect to a designated object displayed outside of the first page;
   in response to the reception of the first input, display a reduced first page that is a smaller version of the first page among a plurality of reduced pages that are respectively smaller versions of the plurality of pages with a plurality of reduced page indicators respectively indicating the plurality of reduced pages, and wherein a reduced first page indicator among the plurality of reduced page indicators, that indicates the reduced first page being displayed, is differently presented relative to remaining reduced page indicators;

while displaying the reduced first page with the plurality of reduced page indicators, receive a second input for switching the reduced first page to a reduced second page among the plurality of reduced pages that is subsequent to the reduced first page; and in response to the reception of the second input, display the reduced second page switched from the reduced first page among the plurality of reduced pages with the plurality of reduced page indicators, wherein a reduced second page indicator among the plurality of reduced page indicators, that indicates the reduced second page being displayed, is highlighted relative to remaining reduced page indicators.

18. The non-transitory computer readable storage medium of claim 17, wherein, in response to the reception of the second input, a second page among the plurality of pages that is subsequent to the first page is set as a current page.

19. The non-transitory computer readable storage medium of claim 18, wherein the reduced second page is displayed concurrently with a first object for causing the reduced first page to appear or to disappear and a second object for ceasing to display the reduced first page.

20. The non-transitory computer readable storage medium of claim 19, wherein the one or more programs comprises instructions which, when executed by the electronic device, further cause the electronic device to:

while displaying the reduced second page including a first icon and a second icon, receive a fourth input on the second object; and in response to the reception of the fourth input, cease to display the reduced first page and display the second page among the plurality of pages with the plurality of page indicators, wherein a second page indicator among the plurality of page indicators, that indicates the second page being displayed, is highlighted relative to remaining page indicators.

* * * * *